Figure 1:
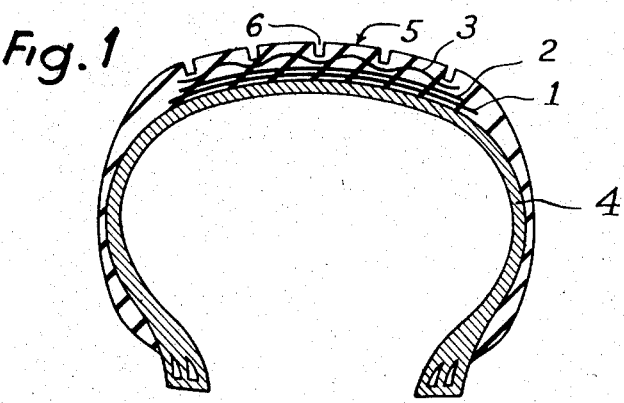

Sept. 19, 1967   J. F. OLAGNIER   3,342,239
PNEUMATIC TIRE CASES, PARTICULARLY FOR AIRPLANES
Filed June 21, 1965   2 Sheets-Sheet 1

INVENTOR
J. F. Olagnier
By [signature]
ATTORNEYS

Sept. 19, 1967  J. F. OLAGNIER  3,342,239
PNEUMATIC TIRE CASES, PARTICULARLY FOR AIRPLANES
Filed June 21, 1965

INVENTOR
J. F. Olagnier
ATTORNEYS

United States Patent Office 3,342,239
Patented Sept. 19, 1967

3,342,239
PNEUMATIC TIRE CASES, PARTICULARLY
FOR AIRPLANES
Jean Francis Olagnier, Levallois, France, assignor to Pneumatiques, Caoutchouc Manufacture et Plastiques Kleber-Colombes, Colombes, Seine, France, a corporation of France
Filed June 21, 1965, Ser. No. 465,647
Claims priority, application France, June 24, 1964, 979,530
8 Claims. (Cl. 152—361)

The present invention relates to pneumatic tire cases (hereinafter referred to as "tires") of the type comprising reinforcing tread plies distributed on the inside of their tread. This construction has been used for tires for fitting to fast moving vehicles, and particularly for airplanes where take off and landing speeds are of the order of 300 kilometers per hour or more.

In one known tire for this purpose, tread plies, distinct from those of the carcass, have as their main aim to increase the resistance to deformation of the tread and to prevent it tearing at high speeds.

When a tire of this type has circumferential ribs on the tread, it is advantageous for it to be arranged so that at least the outermost tread ply, i.e. the one located nearest the tread surface, penetrates into the ribs by being transversely corrugated during molding. This may be ensured during the construction by locating this tread ply quite near the tread surface so that the ribs of the mold for forming the grooves of the tire push back this tread ply locally so as to give it a transversally corrugated shape. However, it occurs that, during the molding, the layer stretches transversely between the ribs of the mold and remains in contact with the ridges of the ribs. After withdrawing the tire from the mold, the cords constituting the tread ply appear at the base of the grooves of the tire. The cords thus appearing at the base of the groove have a tendency to loosen themselves from the rubber of the thread and to cause cracking at the bottom of the grooves. The ribs of the tire thus become more sensitive to the tearing arising from such cracks made by the cords.

The invention has for an object to avoid this disadvantage. To this end the invention consists in a tire for a fast moving vehicle, and particularly for airplanes, having a reinforced tread and circumferential ribs, wherein at least one tread ply for reinforcing the tread and located near the tread surface is interrupted in the transverse direction at positions corresponding approximately to the centers of the circumferential ribs of the tire so as to form a plurality of distinct bands curving inwards beneath the grooves and extending into the ribs.

This reinforcing fabric may be used by itself or in connection with other similar reinforcing tread ply transversely extending into the tread and interrupted under the nadir of the grooves of the tire or even uninterrupted from one side to the other of the tread.

Figure 2:
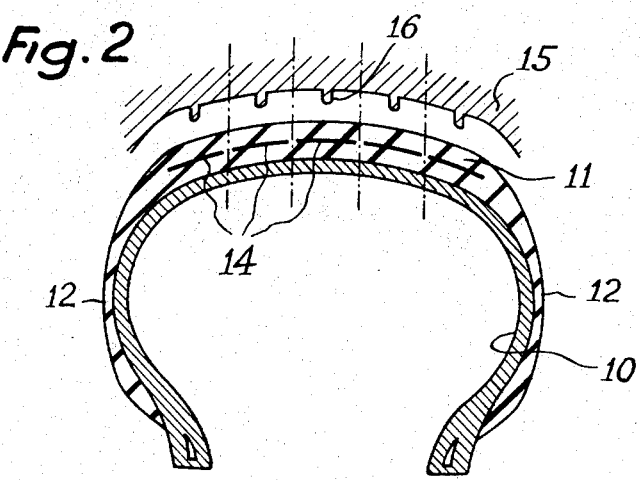
Figure 3:
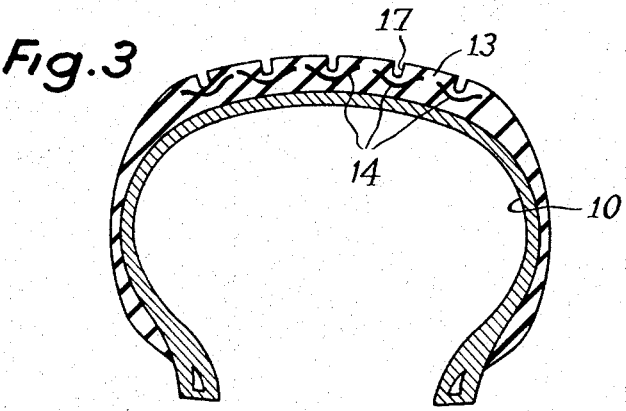
Figure 4:
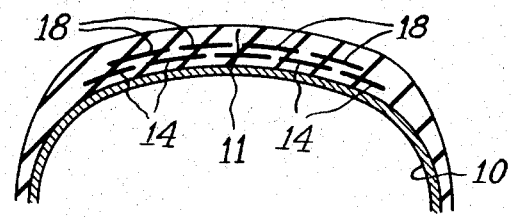
Figure 5:
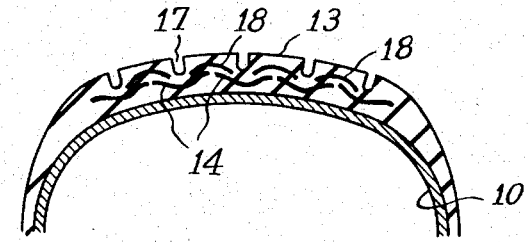
Figure 6:
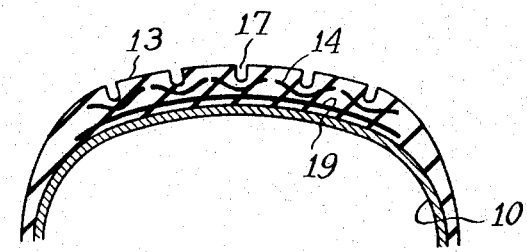
Figure 7:
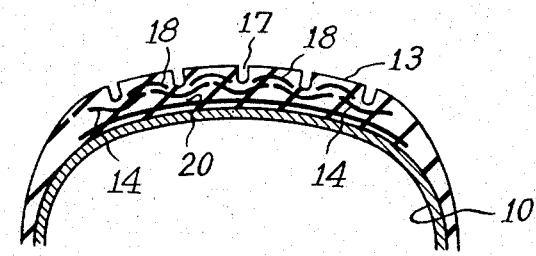
Figure 8:
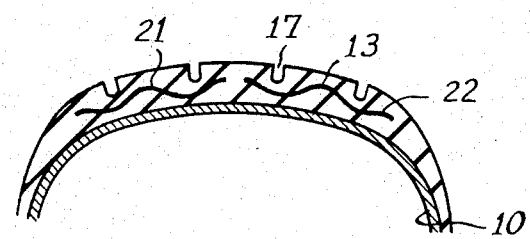

In order that the invention may be more clearly understood, reference will now be made to the accompanying drawings which show some embodiments thereof by way of example, together with a tire of known kind, and in which:

FIGURE 1 shows a cross section through a tire of known type,

FIGURES 2 and 3 show cross sections through a first embodiment of a tire according to the invention, before and after molding, FIGURES 4 and 5 show partial views in cross section showing another embodiment of tire before and after molding, and FIGURES 6, 7 and 8 show partial views of cross sections through other embodiments of tire construction according to the invention.

Referring now to the drawings, FIGURE 1 shows a cross-section through a tire of known kind, the tread ply being shown shown at 1, 2 and 3, and the carcass at 4. With circumferential tread ribs, it is advantageous if the outermost ply 3 penetrates into the ribs of the tread 5 by being transversely corrugated. This is effected by locating the ply 3 sufficiently near the tread 5 during construction, so that on molding, the mold ribs push back the ply 3 locally to corrugate it transversely. However, as referred to above, the ply 3 stretches transversely between the mold ribs during molding and remains in contact with the rib ridges. On withdrawing the tire from the mold, the cords constituting the ply 3 appear at the base of the grooves 6 and these cords have a tendency to become detached from the rubber of the tread and to cause cracking at the bottom of the grooves.

In the first embodiment shown in FIGURES 2 and 3, a tire according to the invention comprises a carcass 10 constituted of one or more superimposed plies of cord fabric (fabric without weft or having a light weft constituted of parallel cables embedded in a thin layer of rubber), the number of these plies being dependent on the dimensions of the tire and of the required strength. The carcass is externally covered with a layer of rubber forming the tread 11 and the sidewalls 12 of the tire.

While the tire is being constructed, a reinforcing tread ply is placed inwardly of the tread 11, at about half the thickness of the rubber, the purpose of this ply being to reduce the total flexibility of the tread in order to bring this flexibility nearer that of the carcass 10 in order to avoid a sharp variation of flexibility between these two parts of the tire after molding.

According to the invention, this reinforcing tread ply is interrupted in the transverse direction at positions corresponding approximately to the centers of the circumferential ribs 13 of the tread. The reinforcing tread ply is thus divided into a plurality of parallel, circumferential bands 14. When the tire blank is placed in the vulcanizing mold 15 (see FIGURE 2) the bands 14 are located opposite the ribs 16 of the mold intended to form circumferential grooves 17 defining the ribs 13 of the tread. During molding, the ribs 16 of the mold penetrate into the rubber of the tread by pushing back each of the bands 14. Due to the fact that these bands are distinct from one another, they cannot extend in the transverse direction between the ribs of the mold so that they remain entirely embedded within the tread.

After withdrawing the tire from the mold, the bands 14 present substantially the form indicated in FIGURE 3, i.e. their median part is curved inwards beneath each groove 17 of the tire while their edges extend within the ribs 13. Thus the bands 14 do not appear at the bottom of the grooves 17, and bring about an effective reinforcement of the whole of the tread up to the ribs 13 of the tire.

The reinforcing tread ply constituted by the circumferential bands 14 may be associated with other reinforcing tread plies completing their efficacy. In the construction according to FIGURES 4, 5, the bands 14 are combined with another reinforcing tread ply arranged above, i.e. nearer the tread surface. This layer also consists of a plurality of circumferential bands 13 obtained by dividing along the circumference but these divisions are in this case located in the axial plane of the grooves 17 of the tire. The bands 14 and 18 are placed, during manufacture, in the position shown in FIGURE 4, one covering the other in the transverse direction. After molding, the bands 14 and 18 have a transversely corrugated shape as FIGURE 5 shows. As a modification of FIGURE 5, the bands 18 may be arranged below the bands 14.

In the case of the embodiment of FIGURE 6, the reinforcing tread ply formed by the circumferential bands 14 is associated with another reinforcing tread ply 19 arranged below, near the carcass and extending transversely in an uninterrupted fashion from one edge to the other of the tread.

The construction according to FIGURE 7 combines the ply formed by the transversely corrugated bands 14 and 18 with a transverse, uninterrupted tread ply 20 located near the carcass.

It is not always necessary, in order to obtain the result sought for by the invention, to divide the reinforcing tread ply located near the tread surface along the axial planes of all the ribs 13 of the tire. When these ribs 13 are quite wide, it may be sufficient to divide the ply at every second rib for example. FIGURE 8 thus shows a construction in which the tread ply for reinforcing the tread is constituted only by two bands 21–22 interrupted along the axis of the central rib of the tread.

The reinforcing tread ply in question are generally constituted of parallel cords, previously coated with rubber, these cords forming a certain angle with respect to the equatorial plane of the tire. When there is only a single ply constituted of a plurality of parallel bands 14, as in the case of FIGURE 3, the cords constituting these bands 14 may all be oriented in the same direction or they may even be oriented differently or even in directions opposite one another.

When there is a plurality of reinforcing tread plies distributed at different heights in the thickness of the tread, as is the case in FIGURES 5, 6 and 7, the cables each constituting these plies may all be oriented in the same direction but the direction of the cords may be alternate from one ply to the other.

When the tire is of the type having a crossed carcass, i.e. in which the carcass plies themselves form an angle with respect to the equatorial plane of the tire, the invention provides that the reinforcing ply incorporated in the tread is constituted of cords forming with respect to the equatorial plane an angle which is greater than the angle of the cords of the carcass. By adopting this measure, during molding, the transverse corrugation of the reinforcing fabric is facilitated, which enables it to pass better round the bottoms of the grooves 17 and to extend further into the ribs 13 of the tire. The difference in angle between the cords of the plies of the carcass and the cords of the reinforcing tread plies may be of the order of 10 to 15° at the crown of the tire.

Of course, the invention is not strictly limited to the described examples of construction with reference to the drawings, and other modifications may be conceived. Moreover, the invention may be applied also the tires having zig-zag or corrugated ribs but having a general circumferential direction.

I claim:

1. A pneumatic tire casing having a carcass and a circumferentially ribbed and grooved rubber tread, comprising at least one reinforcing tread ply of cords embedded within the tread rubber, said at least one tread ply being interrupted in the transverse direction at at least one point located approximately below the center of a selected rib of said tread, to form a plurality of bands extending toward the center of at least said selected rib and curving inwards below an adjacent tread groove but remaining entirely embedded within the tread rubber.

2. A pneumatic tire casing according to claim 1, in which said at least one tread ply is interrupted along a circumferential line located in the axial plane of each rib of said tread.

3. A pneumatic tire casing according to claim 1 comprising at least one other reinforcing tread ply interrupted along a circumferential line located in the axial plane of at least one of the grooves of said tread, to form a plurality of bands extending into at least one adjacent tread rib.

4. A pneumatic tire casing according to claim 1 comprising at least one uninterrupted reinforcing tread ply arranged within said tread below the said bands and extending transversely of said tread.

5. A pneumatic tire casing according to claim 1 comprising at least one other reinforcing tread ply interrupted along a circumferential line located in the axial plane of at least one of the grooves of said tread, to form a plurality of bands extending into at least one adjacent tread rib and at least one uninterrupted reinforcing tread ply arranged within said tread below said bands and extending transversely of said tread.

6. A pneumatic tire casing according to claim 1 wherein said at least one reinforcing tread ply is constituted of cords forming with the equatorial plane of said tire casing angles which are greater than the angles of the cords of the carcass plies.

7. A pneumatic tire casing according to claim 1 whereing said at least one tread ply is interrupted below a central said rib and uninterrupted below an adjacent rib.

8. A pneumatic tire casing having a carcass, and a circumferentially ribbed and grooved tread, comprising at least one reinforcing tread ply within the tire material below said tread, said at least one tread ply being interrupted in the transverse direction at at least one point located approximately below the center of a selected rib of said tread, to form a plurality of bands curving inwards below an adjacent tread groove and extending into at least said selected rib, at least one further tread ply located below said tread and interrupted along a circumferential line located in the axial plane of at least one of the grooves of said tread, and at least one uninterrupted reinforcing tread ply arranged below said at least one interrupted tread ply and said at least one further tread ply, said at least one uninterrupted reinforcing ply extending transversely of said tread, said carcass being formed of fabric cords and each of said tread plies being constituted of cords forming, with the equatorial plane of said tire casing, angles which are greater than the angles of the cords of the tread constituting said carcass.

References Cited

UNITED STATES PATENTS

| | | | |
|---|---|---|---|
| 1,400,269 | 12/1921 | Darrow | 152—361 |
| 2,710,042 | 6/1955 | Gates | 152—209 |
| 3,225,812 | 12/1965 | Barrett | 152—361 |

ARTHUR L. LA POINT, *Primary Examiner.*

C. W. HAEFELE, R. A. BERTSCH,
*Assistant Examiners.*